United States Patent
Taylor et al.

(10) Patent No.: US 9,623,621 B2
(45) Date of Patent: Apr. 18, 2017

(54) SYSTEM AND METHOD FOR SECURELY CONNECTING PORTIONS OF A COMPOSITE STRUCTURE TOGETHER

(71) Applicant: THE BOEING COMPANY, Chicago, IL (US)

(72) Inventors: Bruce Taylor, Winnipeg (CA); Geoffrey Gibbings, Winnipeg (CA); Rudy Braun, Winnipeg (CA); Kyle Christopher Advent, Winnipeg (CA)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/940,397

(22) Filed: Nov. 13, 2015

(65) Prior Publication Data

US 2016/0293153 A1 Oct. 6, 2016

Related U.S. Application Data

(60) Provisional application No. 62/142,767, filed on Apr. 3, 2015.

(51) Int. Cl.

| | |
|---|---|
| *B32B 3/06* | (2006.01) |
| *B29D 99/00* | (2010.01) |
| *B32B 3/12* | (2006.01) |
| *B32B 1/08* | (2006.01) |
| *B32B 7/08* | (2006.01) |
| *B32B 7/12* | (2006.01) |
| *G10K 11/172* | (2006.01) |
| *B29L 31/00* | (2006.01) |

(52) U.S. Cl.
CPC ..... *B29D 99/0089* (2013.01); *B29D 99/0021* (2013.01); *B32B 1/08* (2013.01); *B32B 3/06* (2013.01); *B32B 3/12* (2013.01); *B32B 7/08* (2013.01); *B32B 7/12* (2013.01); *G10K 11/172* (2013.01); *B29K 2995/0002* (2013.01); *B29L 2031/7504* (2013.01); *B32B 2307/102* (2013.01); *B32B 2605/18* (2013.01)

(58) Field of Classification Search
CPC ........ Y10T 428/197; Y10T 428/192–428/195; Y10T 428/236; E04B 2001/748; E02C 7/045
See application file for complete search history.

(56) References Cited

U.S. PATENT DOCUMENTS

| | | | |
|---|---|---|---|
| 4,346,134 A | 8/1982 | Hilton | |
| 5,776,579 A * | 7/1998 | Jessup | ....................... B32B 3/12 181/288 |
| 6,017,413 A | 1/2000 | Franklin | |
| 7,866,440 B2 * | 1/2011 | Douglas | ................. B64D 33/02 181/210 |
| 7,935,205 B2 * | 5/2011 | Bogue | .................... B29C 73/06 156/252 |
| 8,985,513 B2 | 3/2015 | Dean | |

* cited by examiner

*Primary Examiner* — Alexander Thomas
(74) *Attorney, Agent, or Firm* — Joseph M. Butscher; The Small Patent Law Group, LLC (57) ABSTRACT

A composite component assembly may include a composite core including a plurality of core cells between first and second ends. A connection joint is formed between the first and second ends. An adhesive layer is disposed within the connection joint between the first and second ends. The adhesive layer is configured to bond the first and second ends through a curing process. A peg splice securing joint securely connects the first and second ends together before and during the curing process.

23 Claims, 6 Drawing Sheets

SYSTEM AND METHOD FOR SECURELY CONNECTING PORTIONS OF A COMPOSITE STRUCTURE TOGETHER

RELATED APPLICATIONS

This application relates to and claims priority benefits from U.S. Provisional Patent Application No. 62/142,767, entitled "System and Method for Securely Connecting Portions of a Composite Structure Together," filed Apr. 3, 2015, which is hereby incorporated by reference in its entirety.

FIELD OF EMBODIMENTS OF THE DISCLOSURE

Embodiments of the present disclosure generally relate to systems and methods for securely connecting portions of a composite structure together, and more particularly, to systems and methods for securely connecting portions of composite segments or portions together in order to provide stability during a curing process.

BACKGROUND OF THE DISCLOSURE

Jet aircraft typically include one or more engines that may generate high levels of noise. For example, a fan case within a housing secured to a wing of an aircraft typically generates noise. Often, engine housings include one or more sound dampening structures that are used to absorb at least a portion of the noise generated by components of an engine. For example, an acoustic inlet barrel may be positioned at or proximate to an inlet of the engine housing upstream from a fan case.

Known acoustic inlet barrels are formed of composite materials, such as carbon-reinforced plastics, that are sandwiched around an acoustic core, which may include a porous foam material. Each acoustic inlet barrel is generally formed of multiple pieces. For example, each acoustic inlet barrel may be formed of two or three pieces that are secured together through fasteners, such as bolts. Bulky bolt flanges are formed on the pieces and used to connect the pieces together with the separate and distinct fasteners. However, the bolt flanges add mass to the acoustic inlet barrel. Moreover, the process of securing the pieces together is generally labor and time intensive. Further, because each acoustic inlet barrel is formed from separate and distinct pieces that are secured together through fasteners, the integrity of the formed acoustic inlet barrel may be compromised through joints, seams, and the like between the pieces. Also, the areas on and around the joints, seams, and the like may exhibit less than optimal acoustical characteristics.

Certain known acoustic inlet barrels are formed through composite sandwich structures. A foaming adhesive is used to connect portions of a composite sandwich structure together. For example, the composite sandwich structure may include a panel that is wrapped around a tool. Ends of the panel form a connection joint. The adhesive is positioned at the connection joint. During a curing process, the adhesive reacts and adheres to the ends of the panel. As the adhesive cools and hardens during or after the curing process, the hardened adhesive forms a structural bond that securely connects the ends of the panel together.

After the forming process, the connection joint is inspected to ensure the integrity of the adhesive connection between the ends of the panel. A core splice gap width represents criteria for verifying the integrity of the adhesive connection. However, the forming process often renders an inspection of the connection joint difficult, as the adhesive connection may be hidden by composite skins that have been cured to the core.

In a typical foam adhesive splice, a gap between core segments may be subject to bondline depressions, which may form surface depressions in composite skins. In some cases, the depressions may cause the component to be rejected, which then results in considerable rework and/or discarding of the component.

Verifying an acceptable core splice gap width is accomplished by joining segments of core prior to bonding of composite skins. As such, the core splices may be visually verified before being subjected to final composite bonding. However, joining the segments in such a manner limits process flexibility and typically requires a two-step cure process.

Another method of verifying core splice gap width is through radiographic inspection. However, fabricating facilities may not have radiographic equipment readily available. Further, radiographic equipment may be expensive and often requires regulatory approval and certified technicians to operate.

Accordingly, a need exists for a system and method for efficiently, cost-effectively, and reliably connecting portions of a composite material together.

SUMMARY OF THE DISCLOSURE

Certain embodiments of the present disclosure provide a composite component assembly that may include a composite core including a plurality of core cells between first and second ends. A connection joint may be formed between the first and second ends. An adhesive layer may be disposed within the connection joint between the first and second ends. The adhesive layer is configured to bond the first and second ends together through a curing process. A peg splice securing joint securely connects the first and second ends together before and during the curing process.

The composite core may have a first height, and the peg splice securing joint may have a second height that is less than the first height. In at least one embodiment, the second height is less than 50% of the first height.

The peg splice securing joint may be urged into outer surfaces of the first and second ends. An outer surface of the peg splice securing joint may be flush with the outer surfaces of the first and second ends.

The adhesive layer may be spaced apart from the peg splice securing joint. The adhesive layer may include a foaming adhesive layer that is configured to react at and above a particular temperature.

Each of the plurality of core cells may include a septum having acoustic properties. The peg splice securing joint may be spaced apart from the septum of each of the plurality of core cells.

The composite core and the peg splice securing joint may be formed of the same material, such as a honeycomb structure. The peg splice securing assembly may include a plurality of peg splice cells.

Certain embodiments of the present disclosure provide a method of forming a composite component assembly. The method may include laying-up a composite core having a plurality of core cells in relation to a mandrel, disposing an adhesive layer within a connection joint between first and second ends of the composite core, securely connecting the first and second ends together with a peg splice securing joint, and curing the composite component assembly. The securely connecting operation securely fastens and stabilizes the first and second ends together before and during the curing process. The curing operation causes the adhesive layer to securely bond the first and second ends together.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for joining segments of a composite core (of a composite sandwich structure) in such a way as to restrict inadvertent core movement during a curing process. Embodiments of the present disclosure include a peg splice layer and an adhesive bonding splice between portions of the core or other such composite structure. The peg splice layer, which may be a fraction of an overall core height, provides a mechanical locking structure that ensures geometrical integrity of the connection joint until an adhesive bonds the portions or segments of the core together.

Embodiments of the present disclosure provide systems and methods that eliminate, mitigate, or otherwise reduce a need for radiographic inspection of a core splice after a curing process. Additionally, the peg splice layer creates a uniform bonding surface across core segments. The peg splice layer cooperates with an adhesive between component segments to create a bridge between the component segments, thereby avoiding a risk of surface depressions on the composite skins connected to the peg splice layer.

Additionally, acoustically-treated core segments include core cells having septums. The septums may be formed from a wide range of materials, and provide barriers that are formed in core cells at a desired height within a core. A partial height peg splice layer ensures that the peg splice layer does not interfere or disturb a septum, thereby maintaining acoustic properties of the core.

Certain embodiments of the present disclosure provide a honeycomb core composite panel that may include at least one first face sheet (for example, a composite skin), a honeycomb core, and at least one second face sheet (for example, another composite skin). The honeycomb core may include at least two full depth core pieces spliced along at least one edge, and at least one partial-depth core splice piece. A top surface of the partial depth splice piece may be flush with a top surface of each of the full depth core pieces. The partial depth splice piece may be attached to the full depth core pieces by a plurality of lap joints, for example. The partial depth splice piece may have a height (for example, a core thickness) less than a distance from a top surface of the two full depth core pieces to an acoustical septum. In at least one embodiment, the partial depth splice piece is less than 50% of the thickness of the full depth core pieces. Alternatively, the partial depth splice piece may be greater than 50% of the thickness of the full depth core pieces, such as between 50%-70% of the thickness of the full depth core pieces.

Certain embodiments of the present disclosure provide a method of manufacturing a composite sandwich panel. The method may include obtaining at least one face sheet (such as a composite skin), a honeycomb core, and at least one second face sheet (such as another composite skin). The method may also include (but does not require) laying up the first face sheet(s) on a mandrel, laying up the honeycomb core over the face sheet(s), and laying up the second sheet(s) over the honeycomb core. The honeycomb core may include acoustical septums. The honeycomb core may include at least two spliced pieces attached through a partial depth core piece. The laying up of the core may include compressing the two spliced pieces against the partial depth core piece to attach the spliced pieces together.

Embodiments of the present disclosure provide systems and methods for efficiently, cost-effectively, and reliably holding together honeycomb acoustical core pieces together before and during a curing process, and maintaining part quality without sacrificing acoustical performance. Such goals are achieved by refraining from using an excessively thick zone of expanding adhesive and not disrupting acoustical membranes, such as septums within cells of a composite core.

Figure 1:
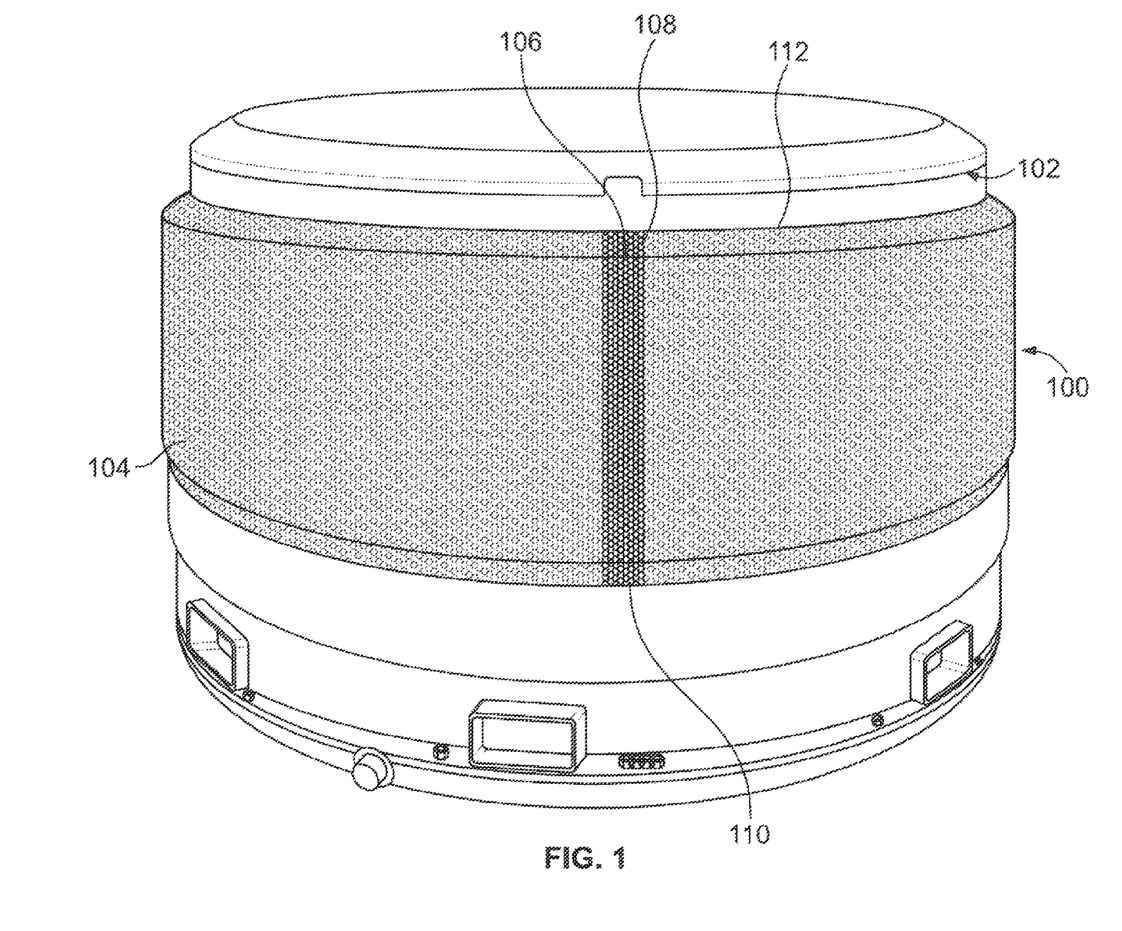
FIG. 1 illustrates a perspective view of a composite core wrapped around a mandrel, according to an embodiment of the present disclosure.

FIG. 1 illustrates a perspective view of a composite core 100 wrapped around a mandrel 102, according to an embodiment of the present disclosure. The composite core 100 may include a composite panel 104 having a first end 106 joined to a second end 108 at a connection joint 110. The composite panel 104 may include a plurality of interconnected honeycomb cells 112. After the composite panel 104 is wrapped around the mandrel 102, the ends 106 and 108 are securely connected together, as described below. The mandrel 102 and the composite core 100 may then be positioned within a curing chamber of a curing oven, for example, to fully form a composite component assembly that includes the composite core 100.

In at least one embodiment, a face sheet (such as a composite skin) may be wrapped around the mandrel 102 before the composite core 100 is wrapped around the mandrel 102. As such, the composite core 100 may be wrapped around the face sheet. After the composite core 100 is wrapped around the mandrel, another face sheet (such as another composite skin) may be wrapped around an outer surface of the composite core 100.

One example of an embodiment of the mandrel 102 is described in U.S. patent application Ser. No. 14/588,465, entitled "System and Method of Forming a Component Using a Mandrel Assembly," filed Jan. 2, 2015, which is hereby incorporated by reference in its entirety.

In order to securely connect the first end 106 to the second end 108 at the connection joint 110 before a curing process, a peg splice securing joint (such as thinner piece of core material) is urged into at least portions of the first and second ends 106 and 108, between which may be an adhesive layer, such as a foaming adhesive.

Figure 2:
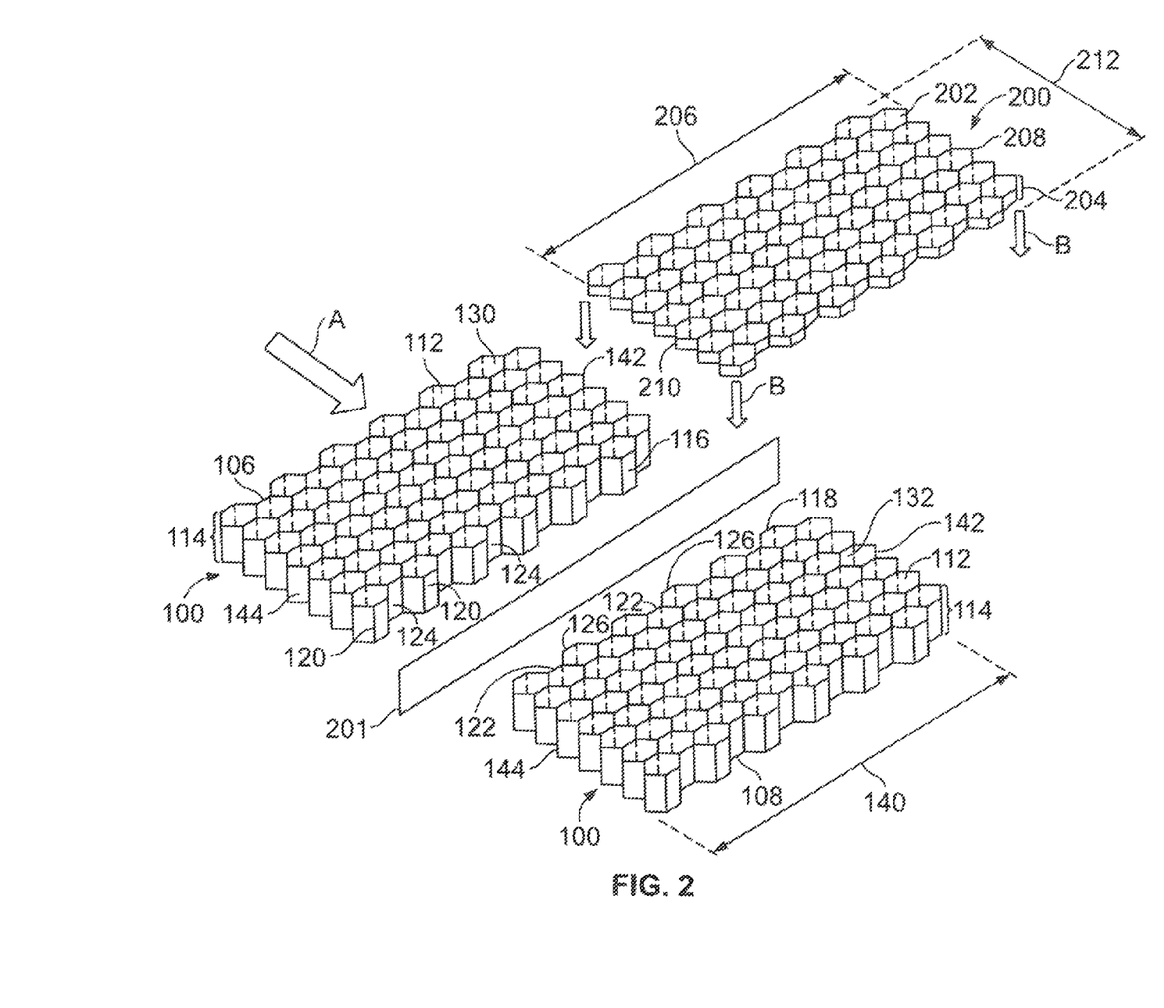
FIG. 2 illustrates a perspective top view of a peg splice securing joint positioned over first and second ends of a composite core, according to an embodiment of the present disclosure.

FIG. 2 illustrates a perspective top view of a peg splice securing joint 200 positioned over the first and second ends 106 and 108 of the composite core 100, according to an embodiment of the present disclosure. It is to be understood that not all of the composite core 100 is shown in FIG. 2. The composite core 100 includes a honeycomb structure having a plurality of hexagonal cells 112 interconnected to one another. Alternatively, the cells 112 may be various other shapes, such as squares, triangles, pentagons, octagons, or the like. Each cell 112 includes a height 114.

An adhesive layer 201 is positioned between terminal edges 116 and 118 of the first and second ends 106 and 108, respectively. The adhesive layer 201 may be or include a planar piece (such as a ribbon, tape, or the like) of foaming adhesive, which is configured to react at a particular temperature, such as 350° F., in order to adhere and bond to surfaces of the terminal edges 116 and 118. Alternatively, the reaction temperature may be greater or less than 350° F.

In order to connect the first and second ends 106 and 108 together, the edge 116 of the first end 106 is urged into the edge 118 of the second end 108, such as in the direction of arrow A. As the first and second ends 106 and 108 are urged into one another, the adhesive layer 201 is trapped and sandwiched between the edges 116 and 118. The first and second edges 116 and 118 may be joined to each other, such that cell peaks 120 of the edge 116 of the first end 106 may nest into cell valleys 122 of the edge 118 of the second end 108, while cell peaks 126 of the edge 118 may nest into cell valleys 124 of the edge 116. The first end 106 may interconnect to the second end 108 in various ways, such as through an interference fit that may or may not include nested portions. As such, the first and second ends 106 and 108 may connect together through an interface connection, such as an interference fit, a nested connection, a lap joint, an abutting connection, a compressive connection, and/or the like. Alternatively, other types of connection interfaces may be formed between the first and second ends 106 and 108.

After the first and second ends 106 and 108 are mated together, such that the adhesive layer 201 is sandwiched between the edges 116 and 118, the peg splice securing joint 200 is urged over top surfaces 130 and 132 of the first and second ends 106 and 108, respectively, in the direction of arrows B, which may be orthogonal to the direction of arrow A. As such, the peg splice securing joint 202 forms a bridge over the connection joint between the first and second ends 106 and 108.

The peg splice securing joint 200 may be formed of the same material as the composite core 100. As such, the peg splice securing joint 200 may include a plurality of interconnected honeycomb cells 202. Each cell 202 may include a height 204 that is less than the height 114 of the cells 112 of the composite core 100. For example, the height 204 may be less than 70% of the height 114 of the cells 112. In at least one embodiment, the height 204 may be less than 50% of the height 114. In at least one other embodiment, the height 204 may be between 50%-70% of the height 114. Alternatively, the height 204 may be greater than the 70% of the height 114, but less than 100% of the height 114.

A width 206 of the peg splice securing joint 200 may be the same as a width 140 of the composite core 100, and may be aligned with and over the ends 106 and 108 so that respective upper and lower edges 208 and 210 are aligned with and over respective upper and lower edges 142 and 144 of the composite core 100. A length 212 of the peg splice securing joint 200 exceeds a thickness of the adhesive layer 201, and may exceed a length of a cell 112. The greater the length 212, the greater the securing force exerted by the peg splice securing joint 200 into the ends 106 and 108. However, if the length 212 is too large, the composite core 100 may be overly rigid. As shown in FIG. 2, for example, the peg splice securing joint 200 may be six cells long. Alternatively, the length 212 may be greater or less than six cells wide. Also, alternatively, the width 206 of the peg splice securing joint 200 may be less than the width 140 of the composite core 100. In at least one embodiment, a plurality of separate and distinct peg splice securing joint segments may be positioned on the first and second ends 106 and 108 along a connection joint therebetween.

Figure 3:
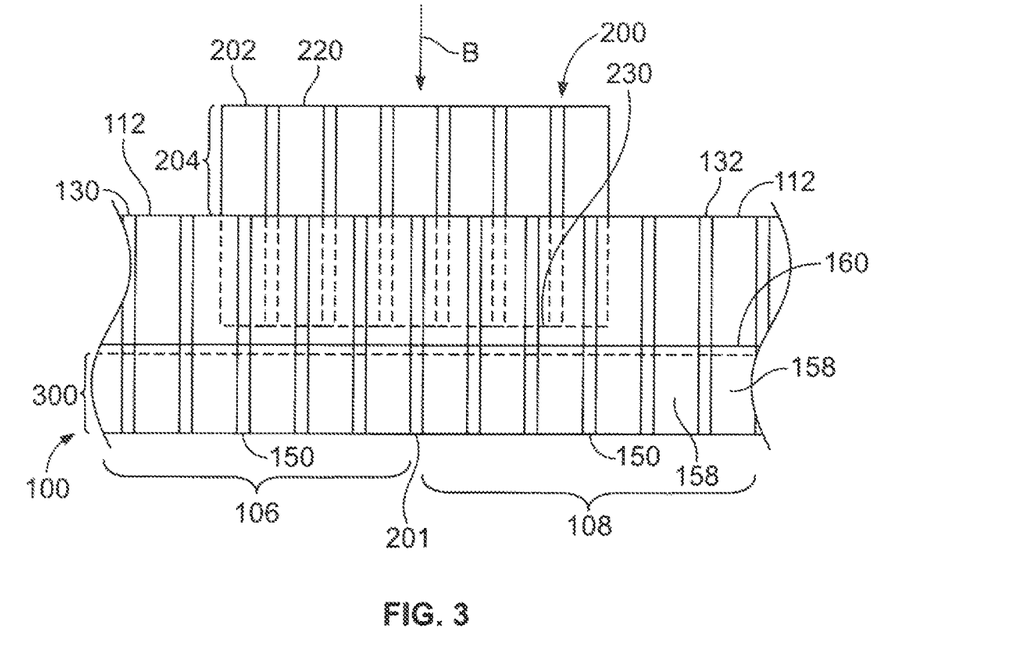
FIG. 3 illustrates a lateral view of a peg splice securing joint positioned on first and second ends of a composite core, according to an embodiment of the present disclosure.

FIG. 3 illustrates a lateral view of the peg splice securing joint 200 positioned on the first and second ends 106 and 108 of the composite core 100, according to an embodiment of the present disclosure. As shown, the peg splice securing joint 200 bridges the first and second ends 106 and 108. The peg splice securing joint 200 may be positioned so that half of its length is positioned over the first end 106, while the other half is positioned over the second end 108. The peg splice securing joint 200 may extend over two to four rows of cells 112 of each of the first and second ends 106 and 108. Alternatively, the peg splice securing joint 200 may extend over less than two or more than four rows of cells 112 of each of the first and second ends 106 and 108. For example, the peg splice securing joint 200 may extend over one and a half rows of cells 112 of each of the first and second ends 106 and 108. As another example, the peg splice securing joint 200 may extend over eight rows of cells 112 of each of the first and second ends 106 and 108.

As shown, the adhesive layer 201 is sandwiched between the first and second ends 106 and 108. The adhesive 202 may extend from a level of a base 150 of the composite core 100 to a height 300 that is less than height 204 of the cells 202 of the peg splice securing joint 200. As such, when the peg splice securing joint 200 is urged downwardly into and through the top surfaces 130 and 132 of the first and second ends 106 and 108, respectively, the bottom of the peg splice securing joint 200 may not extend into the adhesive layer 201, thereby ensuring that the adhesive layer 201 remains in position. Alternatively, the adhesive layer 201 may extend to a height that is shorter or taller than shown. For example, the adhesive layer 201 may extend from the base 150 of the composite core 100 to a height that meets or exceeds the height 204 of the cells 202 of the peg splice securing joint 200. In at least one other embodiment, the adhesive layer 201 may extend from the base 150 to a height of the composite core 100.

In order to securely connect the first end to the second end before a curing process, the peg splice securing joint 200 is urged into and through the top surfaces 130 and 132 of the first and second ends 106 and 108. For example, a tool (such as a hammer, pneumatic actuator, or the like) may be used to urge the peg splice securing joint 200 into position. The peg splice securing joint 200 may be urged downwardly in the direction of arrow B until a top surface 220 of the peg splice securing joint 200 is flush with the top surfaces 130 and 132. During the downward urging in the direction of arrow B, the peg splice securing joint 200 and the composite core 100 may cut into each other, thereby forming a secure mechanical lock therebetween. In this manner, a secure, robust connection joint is formed between the first and second ends 106 and 108 of the composite core. The peg splice securing joint 200 stabilizes and secures the first and second ends 106 and 108 to one another before and during a curing process. In this manner, the peg splice securing joint 200 stabilizes a connection joint between the first and second ends 106 and 108, such as by maintaining an interface therebetween within a desired tolerance. As such, during the curing process, the adhesive layer 201 reacts and ultimately forms a strong, secure adhesive bond between the first and second ends 106 and 108.

As shown, the cells 202 of the peg splice securing joint 200 do not fully extend through an entire height of the cells 112 of the composite core 100.

Accordingly, the cells 202 do not adversely affect acoustic properties of septums of the cells 112, even though portions of the cells 112 may be partially cut or sliced by the peg splice securing joint 200. For example, septums 158 may be formed in each cell 112 up to a height 160 that is below a bottom surface 230 of the peg splice securing joint 200 when the top surface 200 is flush with the top surfaces 130 and 132. The septums 158 may be formed from a wide range of materials, and provide barriers within cells 112 at a desired height within the composite core 100. Because the peg splice securing joint 200 is not as tall as the composite core 100 (for example, the peg splice securing joint 200 is a "partial height" in relation to the cells 112), the peg splice securing joint 200 does not interfere or disturb the septums 158, thereby preserving the acoustical properties of the composite core 100. Additionally, septums may be formed within the cells 202 of the peg splice securing joint 200.

Figure 4:
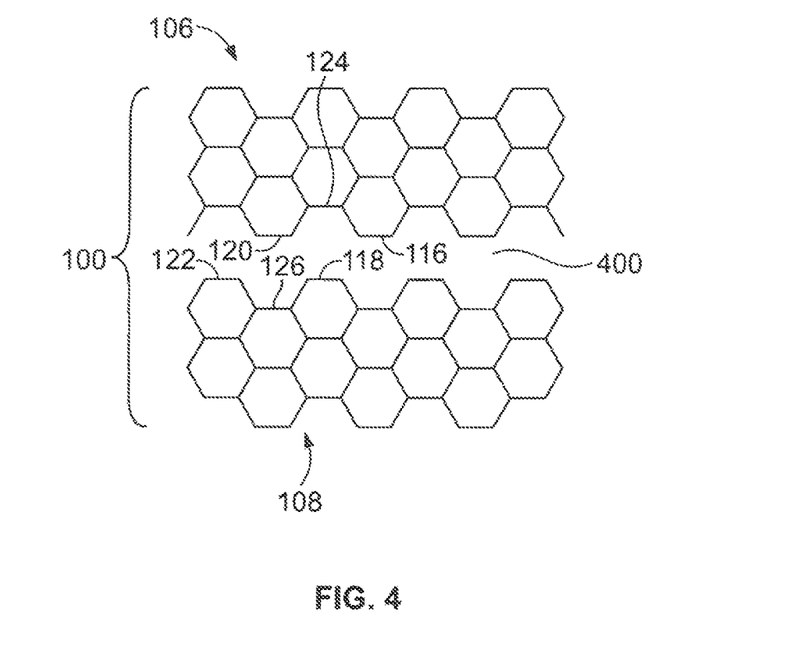
FIG. 4 illustrates a top view of first and second ends of a composite core before a peg splice securing joint is positioned thereon, according to an embodiment of the present disclosure.

FIG. 4 illustrates a top view of the first and second ends 106 and 108 of the composite core 100 before the peg splice securing joint 200 (shown in FIGS. 2 and 3) is positioned thereon, according to an embodiment of the present disclosure. As noted, the adhesive layer 201 (shown in FIGS. 2 and 3) is configured to be sandwiched between the first and second ends 106 and 108. The adhesive layer 201 is sandwiched within a splice gap width 400. A maximum splice gap width $T_{max}$ is a function of core cell geometry and core density. The maximum splice gap width $T_{max}$ may be established based on standardized criteria. After $T_{max}$ is established, an appropriate grade of the adhesive layer 201, such as a foaming adhesive, is applied to connection interfaces between the first and second ends 106 and 108. The first and second ends 106 and 108 may connect to one another such that the adhesive layer 201 contacts an entire length of the edges 116 and 118 of the first and second ends 106 and 108, respectively.

For example, if an adhesive such as BMS5-90 is used in the splice joint, $T_{max}$ may differ based on the particular grade. For BMS5-90, Grade 25, $T_{max}$ may be 0.025". For BMS5-90, Grade 50, $T_{max}$ may be 0.05". For BMS5-90, Grade 100, $T_{max}$ may be 0.1". Further, $T_{max}$ values may be additive, such that if two layers of Grade 50 are used, $T_{max}$ may be 0.1". It is to be understood that the listed adhesives are merely examples, and are not limiting.

Figure 5:
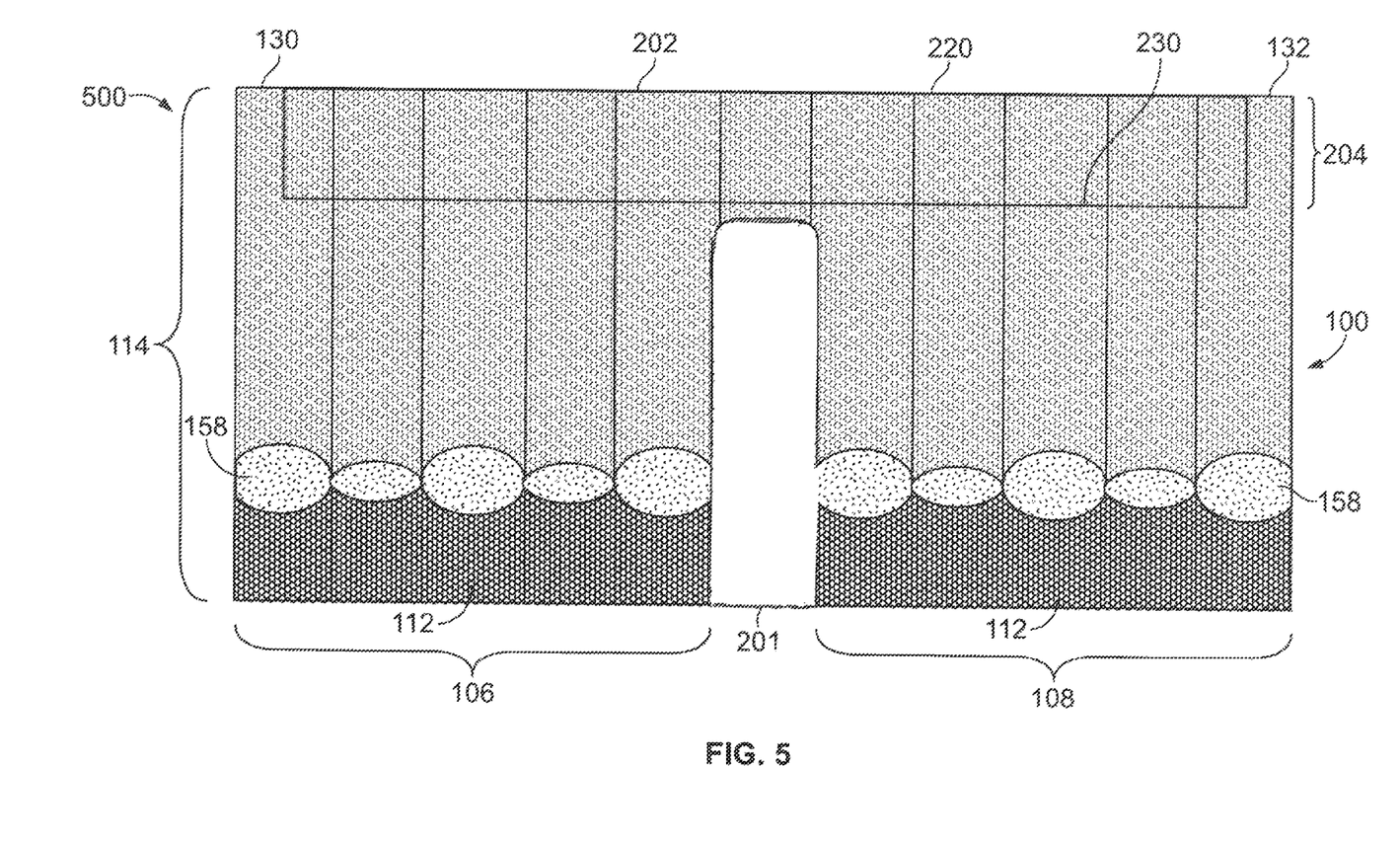
FIG. 5 illustrates a lateral view of first and second ends of a composite core securely connected together through a peg splice securing joint and an adhesive layer, according to an embodiment of the present disclosure.

FIG. 5 illustrates a lateral view of the first and second ends 106 and 108 of the composite core 100 securely connected together through the peg splice securing joint 200 and the adhesive layer 201, according to an embodiment of the present disclosure. As shown, the top surface 220 of the peg splice securing joint 200 may be flush, or substantially flush, with the top surfaces 130 and 132 of the first and second ends 106 and 108 of the composite core 100. The bottom surface 230 of the peg splice securing joint 200 may not abut into the adhesive layer 201 or the septums 158 within the cells 112 of the composite core 100. That is, the peg splice securing joint 200 may not interfere with the adhesive layer 201 or the septums 158. Alternatively, the peg splice securing joint 200 may contact (for example, abut against, extend into, or the like) at least a portion of the adhesive layer 201 and/or the septums 158.

The peg splice securing joint 200 ensures that the first and second ends 106 and 108 remain in a fixed, secure, and stable relationship with respect to one another before and during a curing process. As such, the composite component assembly 500, which includes the composite core 100, the peg splice securing joint 200, and the adhesive layer 201, may be positioned within a curing oven and cured, such that the adhesive layer 201 reacts and ultimately bonds the first end 106 to the second end 108. The composite component assembly 500 may also include first and second composite skins that sandwich the composite core 100 therebetween.

As shown in FIG. 5, the height 204 of the peg splice securing joint 200 is less than 50% of the height 114 of the composite core 100. For example, the height 204 may be approximately 25% of the height 114. Alternatively, the height 204 may be greater or less than 25% of the height 114. As the depth of height 204 increases, the height of the adhesive layer 201 may decrease so that the peg splice securing joint 200 does not interfere with the adhesive layer 201.

Figure 6:
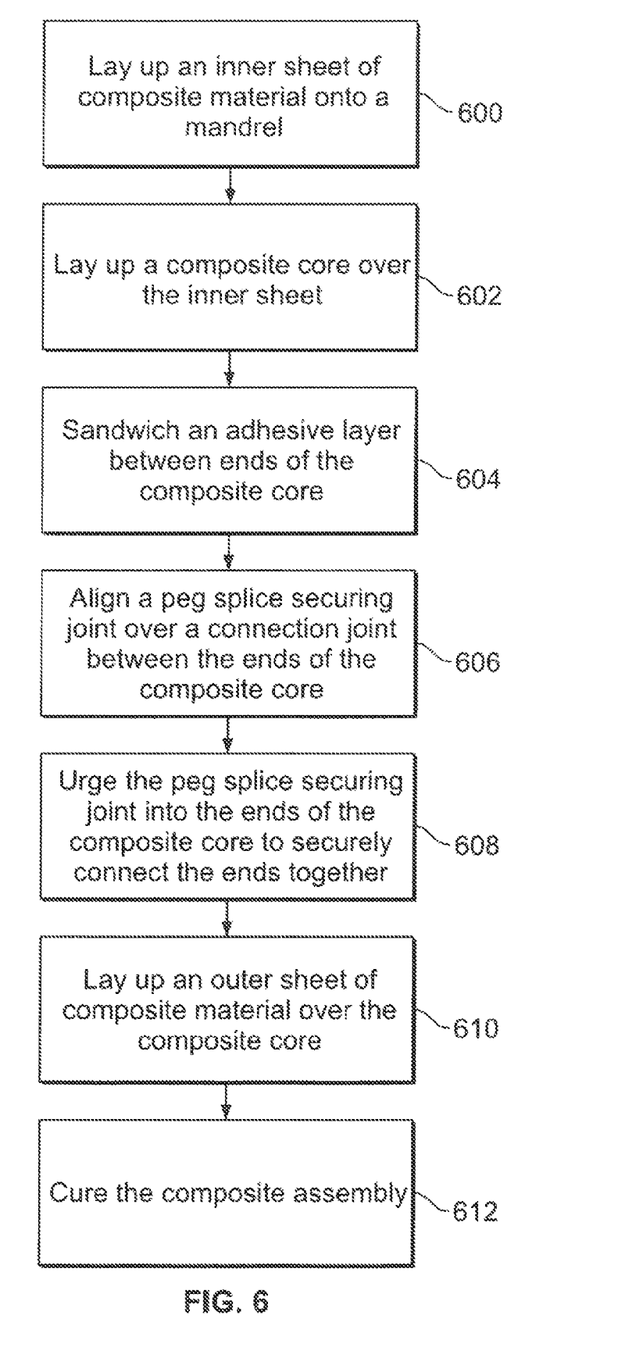
FIG. 6 illustrates a flow chart of a method of forming a composite component assembly, according to an embodiment of the present disclosure.

FIG. 6 illustrates a flow chart of a method of forming a composite component assembly, according to an embodiment of the present disclosure. The method may begin at 600, in which an inner sheet of composite material (such as a first or inner composite skin) is laid up onto a mandrel. The inner sheet may be a single layer of composite material, which may include one or more plies of composite material. Next, at 602, a composite core is laid up over the inner sheet. Alternatively, 600 may be omitted, and the composite core may be laid up over the mandrel. At 606, a peg splice securing joint is aligned over a connection joint between ends of the composite core. Then, at 608, the peg splice securing joint is urged into the ends of the composite core to securely connect the end together. At 610, an outer sheet of composite material (such as a second or outer composite skin) is laid up over the composite core. Alternatively, 610 may be omitted. Then, at 612, the formed composite component assembly is cured.

Figure 7:
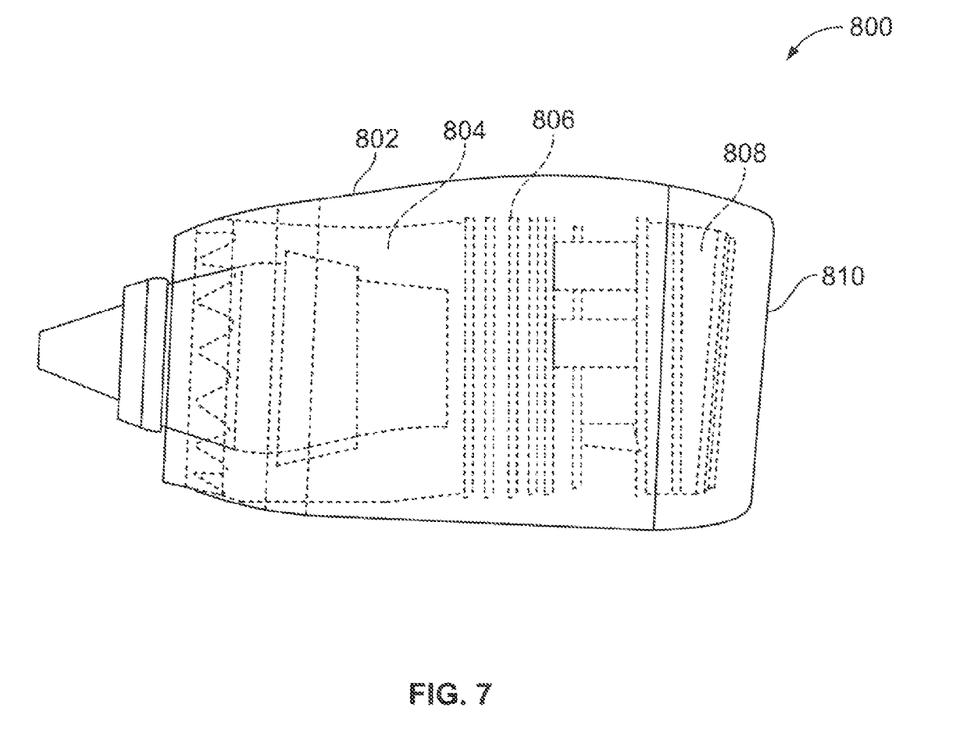
FIG. 7 illustrates an internal view of an aircraft engine, according to an embodiment of the present disclosure.

FIG. 7 illustrates an internal view of an aircraft engine 800, according to an embodiment of the present disclosure. The aircraft engine 800 includes a main housing 802 that retains a fan 804, an engine 806, and a composite component assembly 808, such as an acoustic inlet barrel, positioned proximate to an air intake inlet 810 of the aircraft engine 800. The composite component assembly 808 may be formed as described above. The composite component assembly 808 may be secured to a fixture assembly and machined before being secured within the main housing 802, such as described in U.S. patent application Ser. No. 14/588,468, entitled "System and Method of Securing a Component in Position for Machining Using a Fixture Assembly," filed Jan. 2, 2015, which is hereby incorporated by reference in its entirety.

Alternatively, embodiments of the present disclosure may be used to form various other composite components, such as exhaust acoustic treatments, plugs, nozzles, thrust reversers, bypass ducts, and the like.

Referring to FIGS. 1-7, embodiments of the present disclosure provide systems and methods of forming a composite component assembly. Embodiments of the present disclosure provide systems and methods of joining segments of composite core that restrict core movement during curing processes. The core segments, such as ends of the core, may be positioned according to guidelines established for $T_{max}$ and foaming adhesive bondlines. An appropriate grade of foaming adhesive may be established per particular guidelines. Instead of applying the foaming adhesive to an entire height of the core segments, the foaming adhesive may be trimmed such that a partial height peg splice securing joint may be applied to one side of the splice joint and not interfere with the foaming adhesive once fully embedded. Alternatively, the foaming adhesive may contact the peg splice securing joint. The peg splice securing joint provides a mechanical restraint and prevents the core segments from moving relative to one another during a curing process. Accordingly, a compliant foaming adhesive core bond is formed that does not require post cure verification, due to the core splice gap being maintained throughout the curing process.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite component assembly, comprising:
   a composite core including a plurality of core cells between first and second ends, wherein a connection joint is formed between the first and second ends;
   an adhesive layer disposed within the connection joint between the first and second ends, wherein the adhesive layer is configured to bond the first and second ends through a curing process; and
   a peg splice securing joint that securely connects the first and second ends together before and during the curing process,
   wherein the peg splice securing joint is urged into outer surfaces of the first and second ends, and wherein an outer surface of the peg splice securing joint is flush with the outer surfaces of the first and second ends.

2. The composite component assembly of claim 1, wherein the composite core has a first height, and wherein the peg splice securing joint has a second height that is less than the first height.

3. The composite component assembly of claim 1, wherein the second height is less than 50% of the first height.

4. The composite component assembly of claim 1, wherein the adhesive layer is spaced apart from the peg splice securing joint.

5. The composite component assembly of claim 1, wherein the adhesive layer comprises a foaming adhesive layer that is configured to react at and above a particular temperature.

6. The composite component assembly of claim 1, wherein each of the plurality of core cells comprises a septum having acoustic properties.

7. The composite component assembly of claim 6, wherein the peg splice securing joint is spaced apart from the septum of each of the plurality of core cells.

8. The composite component assembly of claim 1, wherein the composite core and the peg splice securing joint are formed of the same material, wherein the peg splice securing joint includes a plurality of peg splice cells.

9. A composite component assembly, comprising:
   a composite core including a plurality of honeycomb core cells between first and second ends, wherein a connection joint is formed between the first and second ends, wherein the composite core has a first height, wherein each of the plurality of honeycomb core cells comprises a septum having acoustic properties;
   a foaming adhesive layer disposed within the connection joint between the first and second ends, wherein the foaming adhesive layer is configured to bond the first and second ends through a curing process; and a peg splice securing joint that securely connects the first and second ends together before and during the curing process, wherein the peg splice securing joint has a second height that is less than 50% of the first height, wherein the peg splice securing joint is urged into outer surfaces of the first and second ends, and wherein an outer surface of the peg splice securing joint is flush with the outer surfaces of the first and second ends.

10. The composite component assembly of claim 9, wherein the peg splice securing joint is spaced apart from the septum of each of the plurality of core cells.

11. A composite component assembly, comprising:
a composite core including a plurality of core cells between first and second ends, wherein a connection joint is formed between the first and second ends;
an adhesive layer disposed within the connection joint between the first and second ends, wherein the adhesive layer is configured to bond the first and second ends through a curing process; and
a peg splice securing joint that securely connects the first and second ends together before and during the curing process,
wherein the adhesive layer is spaced apart from the peg splice securing joint.

12. The composite component assembly of claim 11, wherein the composite core has a first height, and wherein the peg splice securing joint has a second height that is less than the first height.

13. The composite component assembly of claim 11, wherein the second height is less than 50% of the first height.

14. The composite component assembly of claim 11, wherein the adhesive layer comprises a foaming adhesive layer that is configured to react at and above a particular temperature.

15. The composite component assembly of claim 11, wherein each of the plurality of core cells comprises a septum having acoustic properties.

16. The composite component assembly of claim 15, wherein the peg splice securing joint is spaced apart from the septum of each of the plurality of core cells.

17. The composite component assembly of claim 11, wherein the composite core and the peg splice securing joint are formed of the same material, wherein the peg splice securing joint includes a plurality of peg splice cells.

18. A composite component assembly, comprising:
a composite core including a plurality of core cells between first and second ends, wherein a connection joint is formed between the first and second ends;
an adhesive layer disposed within the connection joint between the first and second ends, wherein the adhesive layer is configured to bond the first and second ends through a curing process; and
a peg splice securing joint that securely connects the first and second ends together before and during the curing process,
wherein the composite core and the peg splice securing joint are formed of the same material, wherein the peg splice securing joint includes a plurality of peg splice cells.

19. The composite component assembly of claim 18, wherein the composite core has a first height, and wherein the peg splice securing joint has a second height that is less than the first height.

20. The composite component assembly of claim 18, wherein the second height is less than 50% of the first height.

21. The composite component assembly of claim 18, wherein the adhesive layer comprises a foaming adhesive layer that is configured to react at and above a particular temperature.

22. The composite component assembly of claim 18, wherein each of the plurality of core cells comprises a septum having acoustic properties.

23. The composite component assembly of claim 22, wherein the peg splice securing joint is spaced apart from the septum of each of the plurality of core cells.

\* \* \* \* \*